United States Patent
Cao et al.

(10) Patent No.: US 10,884,308 B2
(45) Date of Patent: Jan. 5, 2021

(54) MICROSTRIP LINE CONFIGURATION FOR PHASE-SHIFT UNIT, ANTENNA ARRAY, DISPLAY PANEL AND DISPLAY DEVICE

(71) Applicants: BOE TECHNOLOGY GROUP CO., LTD., Beijing (CN); Beijing BOE Optoelectronics Technology Co., Ltd., Beijing (CN)

(72) Inventors: Xue Cao, Beijing (CN); Junhui Wu, Beijing (CN); Ying Wang, Beijing (CN); Peizhi Cai, Beijing (CN); Zhifu Li, Beijing (CN); Lijun Mao, Beijing (CN); Jiaheng Wang, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

(*) Notice: Subject to any disclaimer, the term of this patent is extended or adjusted under 35 U.S.C. 154(b) by 332 days.

(21) Appl. No.: 15/750,810

(22) PCT Filed: Aug. 18, 2017

(86) PCT No.: PCT/CN2017/098043
§ 371 (c)(1),
(2) Date: Feb. 6, 2018

(87) PCT Pub. No.: WO2018/137339
PCT Pub. Date: Aug. 2, 2018

(65) Prior Publication Data
US 2020/0089042 A1   Mar. 19, 2020

(30) Foreign Application Priority Data
Jan. 24, 2017 (CN) ............ 2017 1 0060025

(51) Int. Cl.
*G02F 1/137* (2006.01)
*G02F 1/1333* (2006.01)
(Continued)

(52) U.S. Cl.
CPC .... *G02F 1/13731* (2013.01); *G02F 1/133308* (2013.01); *G02F 1/133514* (2013.01);
(Continued)

(58) Field of Classification Search
CPC .......... G02F 1/13731; G02F 1/136286; G02F 1/133514; G02F 1/133308;
(Continued)

(56) References Cited

U.S. PATENT DOCUMENTS 6,556,168 B1* 4/2003 Marumoto ......... H01Q 21/0087
                                                        342/372
6,559,798 B1* 5/2003 Marumoto ........... H01Q 3/2605
                                                        342/372
(Continued)

FOREIGN PATENT DOCUMENTS

CN       1580909 A     2/2005
CN     101206330 A     6/2008
(Continued)

OTHER PUBLICATIONS

First Chinese Office Action dated Oct. 8, 2018, received for corresponding Chinese Application No. 201710060025.4.
(Continued)

*Primary Examiner* — Ryan Crockett
(74) *Attorney, Agent, or Firm* — Kinney & Lange, P.A.

(57) ABSTRACT

The present disclosure discloses a phase-shift unit, an antenna array, a display panel and a display device. In one embodiment, the phase-shift unit includes a first substrate and a second substrate assembled to each other; a liquid crystal layer between the first substrate and the second
(Continued)

substrate; a microstrip line provided at a side of the second substrate facing towards the liquid crystal layer, and configured for receiving a voltage signal that controls deflection of liquid crystal molecules in the liquid crystal layer and for receiving or transmitting an electromagnetic wave signal; and a grounding layer provided on the first substrate and including a via hole corresponding to the microstrip line.

16 Claims, 4 Drawing Sheets (51) Int. Cl.
*G02F 1/1362* (2006.01)
*G02F 1/1335* (2006.01)
*H01Q 1/38* (2006.01)
*H01Q 1/50* (2006.01)
*H01Q 3/36* (2006.01)

(52) U.S. Cl.
CPC .......... *G02F 1/136286* (2013.01); *H01Q 1/38* (2013.01); *H01Q 1/50* (2013.01); *H01Q 3/36* (2013.01); *G02F 2001/133354* (2013.01)

(58) Field of Classification Search
CPC .......... G02F 2001/133354; H01Q 3/36; H01Q 1/50; H01Q 1/38; H01Q 9/0457; H01Q 21/065; H01Q 21/00; H01P 1/184; H01P 1/181

See application file for complete search history.

(56) References Cited

U.S. PATENT DOCUMENTS

| | | | | |
|---|---|---|---|---|
| 9,755,286 | B2* | 9/2017 | Wang | H01P 11/007 |
| 2009/0278744 | A1* | 11/2009 | Kirino | H01Q 9/045 |
| | | | | 343/700 MS |
| 2010/0131023 | A1* | 5/2010 | Costello | C04B 38/0022 |
| | | | | 607/2 |
| 2013/0293425 | A1* | 11/2013 | Zhu | H01Q 13/10 |
| | | | | 343/702 |
| 2015/0380789 | A1* | 12/2015 | Jakoby | H01Q 9/0407 |
| | | | | 343/905 |

FOREIGN PATENT DOCUMENTS

| | | | |
|---|---|---|---|
| CN | 105308789 | A | 2/2016 |
| CN | 105589269 | A | 5/2016 |
| CN | 106154603 | A | 11/2016 |
| CN | 106299627 | A * | 1/2017 |
| CN | 106299627 | A | 1/2017 |
| CN | 106684551 | A | 5/2017 |
| EP | 2768072 | A1 | 8/2014 |

OTHER PUBLICATIONS

International Search Report & English Translation of Box V of Written Opinion, for PCT Patent Application No. PCT/CN2017/098043, dated Sep. 27, 2017, 15 pages.

* cited by examiner

MICROSTRIP LINE CONFIGURATION FOR PHASE-SHIFT UNIT, ANTENNA ARRAY, DISPLAY PANEL AND DISPLAY DEVICE

CROSS-REFERENCE TO RELATED APPLICATION

This application is a 371 National Stage application of International Application No. PCT/CN2017/098043, with an international filing date of Aug. 18, 2017, which has not yet published, and which claims priority to Chinese Patent Application No. 201710060025.4 filed on Jan. 24, 2017 in the State Intellectual Property Office of China, the present disclosures of which are hereby incorporated by reference in their entirety.

TECHNICAL FIELD

The present disclosure relates to technical field of display technology, and particularly, to a phase-shift unit, an antenna array, a display panel and a display device.

BACKGROUND

In existing wireless terminals (such as mobile phone, tablet computer and the likes), a display panel and an antenna are two functional modules independently provided, and are required to be designed and manufactured respectively and finally be assembled. The process is relatively complicated. Moreover, almost of the antennas in the terminals are omnidirectional antennas which have high power consumption and thus affect duration performance to a large extent.

A smart antenna is an antenna array which is capable of determining spatial information of a microwave signal by means of intelligent algorithm to achieve tracing and location of microwave signal source. By means of tracing and filtering of microwave signal, strength of microwave signal can be greatly improved, proportion of microwave signal interruption can be reduced, and energy loss can be reduced.

SUMMARY

According to an aspect of embodiments of the present disclosure, there is provided a phase-shift unit, comprising:
a first substrate and a second substrate assembled to each other;
a liquid crystal layer provided between the first substrate and the second substrate;
a microstrip line provided at a side of the second substrate facing towards the liquid crystal layer, and configured for receiving a voltage signal that controls deflection of liquid crystal molecules in the liquid crystal layer and for receiving or transmitting an electromagnetic wave signal; and
a grounding layer provided on the first substrate and including a via hole corresponding to the microstrip line.

In a possible implementation of the phase-shift unit provided according to embodiments of the present disclosure, the grounding layer is provided at a side of the first substrate facing towards the liquid crystal layer. In another possible implementation of the phase-shift unit provided according to embodiments of the present disclosure, the grounding layer is provided at a side of the first substrate facing away from the liquid crystal layer.

In a possible implementation of the phase-shift unit provided according to embodiments of the present disclosure, an orthographic projection of the via hole of the grounding layer onto the second substrate and an orthographic projection of the microstrip line onto the second substrate have an overlapped area therebetween.

In a possible implementation of the phase-shift unit provided according to embodiments of the present disclosure, one end of the microstrip line corresponds in position to the via hole.

In a possible implementation of the phase-shift unit provided according to embodiments of the present disclosure, the other end of the microstrip line is connected to a feeder interface configured for feeding an electromagnetic wave signal from an electrical cable into the microstrip line, or for feeding the electromagnetic wave signal from the microstrip line into the electrical cable.

In a possible implementation of the phase-shift unit provided according to embodiments of the present disclosure, the phase-shift unit further comprises: a direct-current blocking circuit mounted at the feeder interface of the microstrip line and configured for avoiding interference of direct current signal.

In a possible implementation of the phase-shift unit provided according to embodiments of the present disclosure, the electromagnetic wave signal is a microwave signal.

In a possible implementation of the phase-shift unit provided according to embodiments of the present disclosure, the phase-shift unit further comprises: a control unit configured for transmitting the voltage signal that controls deflection of liquid crystal molecules in the liquid crystal layer;
wherein, the microstrip line is connected to the control unit through a lead wire, and the grounding layer is grounded.

In a possible implementation of the phase-shift unit provided according to embodiments of the present disclosure, the phase-shift unit further comprises:
a first alignment layer and a second alignment layer provided at either side of the liquid crystal layer, respectively.

In a possible implementation of the phase-shift unit provided according to embodiments of the present disclosure, the first alignment layer is provided between the liquid crystal layer and the grounding layer; and
the second alignment layer is provided between the liquid crystal layer and a film layer where the microstrip line is located.

Correspondingly, according to another aspect of embodiments of the present disclosure, there is also provided an antenna array, comprising at least two said phase-shift units according to any of the abovementioned embodiments of the present disclosure.

In a possible implementation of the antenna array provided according to embodiments of the present disclosure, the grounding layer is provided at the side of the first substrate facing towards the liquid crystal layer; the antenna array further comprises:
at least two patch units provided at the side of the first substrate facing away from liquid crystal layer and configured for transmitting or receiving the electromagnetic wave signal, wherein the patch units are in a one-to-one positional correspondence to the via holes of the grounding layer, and an orthographic projection of each via hole onto the first substrate is located within an orthographic projection of the patch unit corresponding to the via hole onto the first substrate.

In a possible implementation of the antenna array provided according to embodiments of the present disclosure, the patch unit has a rectangular or circular shape.

In a possible implementation of the antenna array provided according to embodiments of the present disclosure, the antenna array comprises four via holes in an array arrangement, and the antenna array comprises patch units being in a one-to-one positional correspondence to the four via holes, and wherein an orthographic projection of the patch unit onto the first substrate at least covers an orthographic projection of the via hole onto the first substrate.

Correspondingly, according to a yet another aspect of embodiments of the present disclosure, there is also provided a display panel, comprising a display region and a frame region, wherein, at least one set of the antenna array according to any of the abovementioned embodiments of the present disclosure is included in the frame region of the display panel.

In a possible implementation of the display panel provided according to embodiments of the present disclosure, the antenna array is provided at an upper frame, a left frame and/or a right frame of the display panel.

In a possible implementation of the display panel provided according to embodiments of the present disclosure, the microstrip line of the antenna array is provided in the same layer as a gate layer or a source-drain layer of the display region, and the grounding layer of the antenna array is provided in the same layer as a common electrode layer of the display region.

In a possible implementation of the display panel provided according to embodiments of the present disclosure, the first substrate is a color filter substrate and the second substrate is an array substrate; or, the first substrate is an array substrate and the second substrate is a color filter substrate.

Correspondingly, according to a still another aspect of embodiments of the present disclosure, there is also provided a display device, comprising the display panel according to any of the abovementioned embodiments of the present disclosure.

DETAILED DESCRIPTION OF THE EMBODIMENTS

In order to provide a more clear understanding of objects, technique solutions and advantages of the present disclosure, the present disclosure will be further described hereinafter in detail with reference to the attached drawings. Obviously, the described embodiments are only some of embodiments of the present disclosure, instead of all of the embodiments of the present disclosure. For those skilled in the art, all other embodiments achieved by referring to the embodiments of the present disclosure without involving any inventive steps fall into the scope of the present disclosure.

Figure 1:
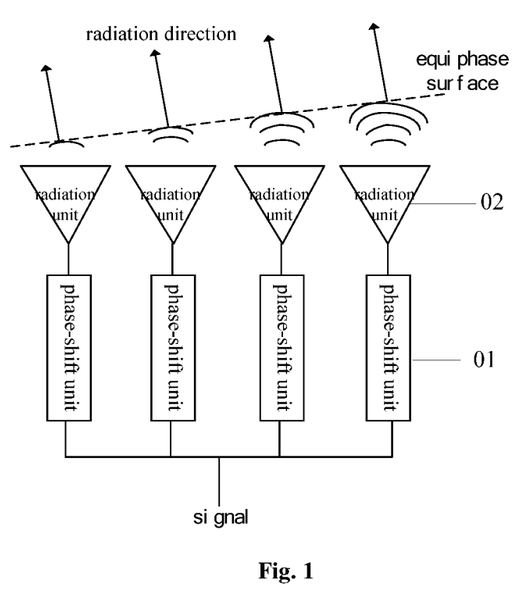
FIG. 1 is a structural schematic view showing a smart antenna provided in related art.

Phased-array antenna is a smart antenna which achieves adjustment of beam direction by controlling a feed phase of a microwave signal. Referring to FIG. 1, after a microwave signal enters a phase-shift unit 01 through a feed network, phase shift capability of each phase-shift unit 01 is adjusted so that the microwave signal arriving at each radiation unit 02 can generate a corresponding phase difference, equiphase surface deflects, and also radiation direction varies accordingly. As a result, radiation directional pattern of the microwave signal can be controlled as long as a phase shift amount of the phase-shift unit 01 is adjusted, which achieves real-time tracing of the microwave signal.

The phase-shift unit, the antenna array, the display panel and the display device provided according to embodiments of the present disclosure use liquid crystals as a transmission medium of an electromagnetic wave signal (taking a microwave signal as an example) and achieves phase control of the microwave signal by deflection of the liquid crystals. Moreover, the phase-shift unit provided according to embodiments of the present disclosure has good compatibility with a display panel.

Shapes and sizes of components in the attached drawings do not reflect actual scale, and only intend to schematically illustrate contents of the present disclosure.

Figure 2:
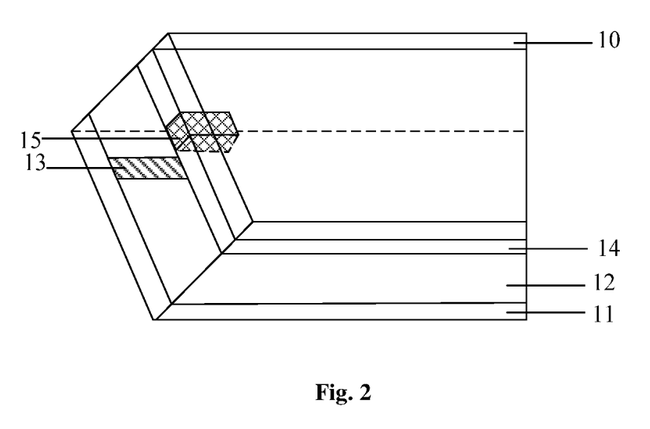
FIG. 2 is a perspective schematic view showing a phase-shift unit according to an embodiment of the present disclosure.
Figure 3A:
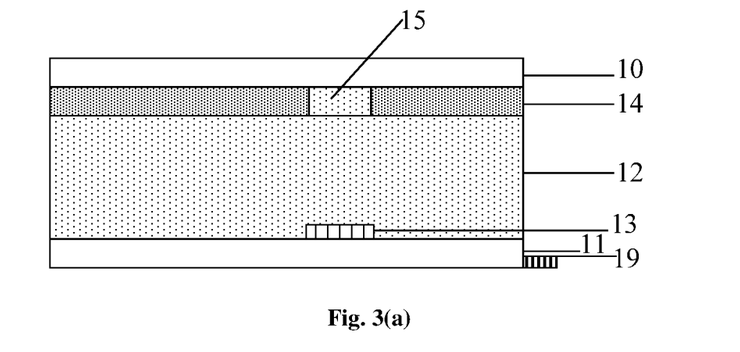
FIG. 3(a) and FIG. 3(b) are sectional schematic views showing the phase-shift unit of FIG. 2, respectively.
Figure 3B:
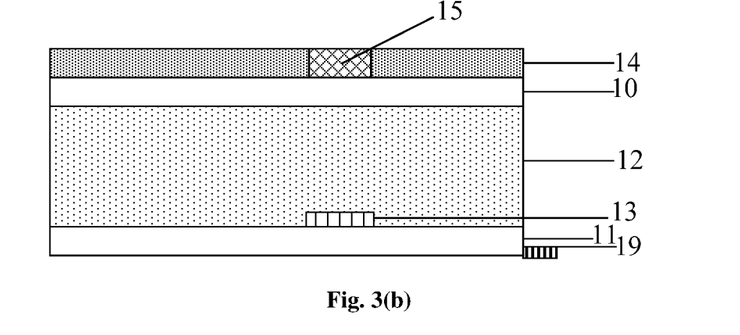

Referring to FIG. 2, FIG. 3(a) and FIG. 3(b), a phase-shift unit provided according to one embodiment of the present disclosure includes: a first substrate 10 and a second substrate 11 assembled to each other; a liquid crystal layer 12 provided between the first substrate 10 and the second substrate 11; a microstrip line 13 provided at a side of the second substrate 11 facing towards the liquid crystal layer 12, and configured for receiving a voltage signal that controls deflection of liquid crystal molecules in the liquid crystal layer and for receiving or transmitting a microwave signal; and a grounding layer 14 provided on the first substrate 10 and including a via hole 15 corresponding to the microstrip line 13. It should be noted that, although it is shown in shadow in FIG. 2 as well as the following figures for example including FIGS. 3(b), 6, 7 and 8, the via hole 15 actually is void, or filled with air. In examples, as shown in FIG. 3(a), the grounding layer 14 is provided at a side of the first substrate facing towards the liquid crystal layer 12, or as shown in FIG. 3(b), the grounding layer 14 is provided at a side of the first substrate away from the liquid crystal layer 12.

Here, FIG. 2 is a perspective schematic view of a phase-shift; and FIG. 3(a) and FIG. 3(b) are sectional schematic views of the phase-shift unit, respectively. In FIG. 2, FIG. 3(a) and FIG. 3(b), only one microstrip line and one via hole are taken as an example, and it is not limited to this structure;

and the phase-shift unit may further comprise a plurality of microstrip lines and a plurality of via holes and similar structures, and it is not specifically limited herein.

Specifically, liquid crystal molecule as anisotropic material owns different dielectric constants in its long axis direction and its short axis direction. The liquid crystal molecule deflects while being applied with a deflection voltage at both ends of the liquid crystal molecule, and dielectric constant of the liquid crystal molecule also varies according to the deflection of the liquid crystal. If the liquid crystal is acted as a transmission media of transmitting a microwave signal, when the microwave signal is transmitting in the liquid crystal with varied dielectric constants, phase of the microwave signal changes accordingly, namely a phase shift occurs. Accordingly, in the embodiments of the present disclosure, phase of the microwave signal is controlled by varying dielectric constants of the liquid crystal molecules. When receiving or transmitting the microwave signal, the liquid crystal layer is deflected under the action of a voltage difference between the microstrip line and the grounding layer, and adjusts the phase of the microwave signal passing through the liquid crystal layer.

A phase-shift unit provided according to embodiments of the present disclosure includes: a first substrate and a second substrate assembled to each other; a liquid crystal layer between the first substrate and the second substrate; a microstrip line provided at a side of the second substrate facing towards the liquid crystal layer, and configured for receiving a voltage signal that controls deflection of liquid crystal molecules in the liquid crystal layer and for receiving or transmitting a microwave signal; and a grounding layer provided on the first substrate and including a via hole corresponding to the microstrip line. As a result, according to embodiments of the present disclosure, the liquid crystal layer is provided between the microstrip line and the grounding layer and is deflected under a voltage difference between the microstrip line and the grounding layer. When the microwave signal propagates in the deflected liquid crystal layer, phase of the microwave signal varies according to deflection of the liquid crystal layer, and the microwave signal is further transmitted through the via hole of the grounding layer. Therefore, the phase-shift unit according to embodiments of the present disclosure achieves use of liquid crystals as transmission media of the microwave signal and controlling of phase of the microwave signal according to the deflection of the liquid crystals. Moreover, the phase-shift unit provided according to embodiments of the present disclosure has good compatibility with a display panel.

In some embodiments, referring to FIG. 3(a), in the phase-shift unit provided according to embodiments of the present disclosure, the grounding layer 14 is provided at a side of the first substrate 10 facing towards the liquid crystal layer 12, so that the microwave signal directly radiates through the via hole after passing through the deflected liquid crystal layer.

In some specific embodiments, in the phase-shift unit provided according to embodiments of the present disclosure, referring to FIG. 3(a) and FIG. 3(b), an orthographic projection of the via hole 15 of the grounding layer 14 onto the second substrate 11 and an orthographic projection of the microstrip line 13 onto the second substrate 11 have an overlapped area therebetween. In particular, the microstrip line 13 corresponds in position to the via hole 15 of the grounding layer, and, after transmitting in the liquid crystal layer as media, the microwave signal in the microstrip line 13 is transmitted to a radiation unit through the via hole 15. Accordingly, in order to further couple the microwave signal in the microstrip line to the via hole, the orthographic projection of the via hole 15 and the orthographic projection of the microstrip line 13, onto the first substrate 10 or the second substrate 11, are overlapped, so that the microstrip line couples the microwave signal to the via hole of the grounding layer in a minimum distance in a vertical direction.

Figure 4:
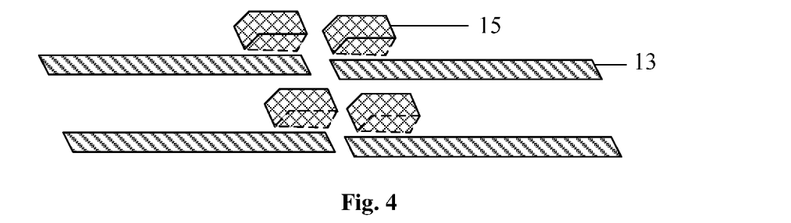
FIG. 4 is a perspective schematic view showing another phase-shift unit according to the embodiment of the present disclosure.

In some specific embodiments, in the phase-shift unit provided according to embodiments of the present disclosure, referring to FIG. 4, one end of the microstrip line 13 corresponds to the via hole. In particular, when the phase-shift unit comprises four via holes, the four via holes correspond to four microstrip lines. For example, one end of each microstrip line 13 corresponds to one via hole. Referring to FIG. 4, the four via holes are in an array arrangement, and one end of each of the four microstrip lines 13 corresponds in position to one via hole.

Figure 5:
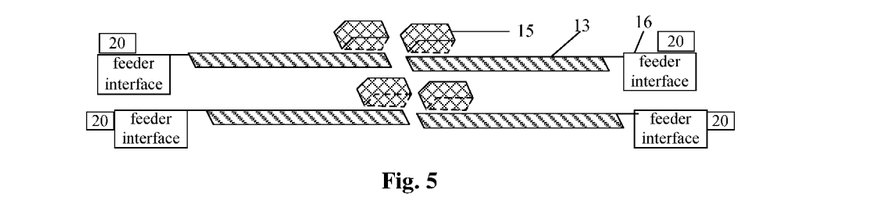
FIG. 5 is a perspective schematic view showing a yet another phase-shift unit according to the embodiment of the present disclosure.

In some specific embodiments, in the phase-shift unit provided according to embodiments of the present disclosure, referring to FIG. 5, the other end of the microstrip line 13 is connected to a feeder interface 16 configured for feeding a microwave signal from an electrical cable into the microstrip line, or for feeding the microwave signal from the microstrip line into the electromagnet cable. In particular, a plurality of microstrip lines are connected to one feeder interface, or each microstrip line is connected to a different feeder interface. In a specific implementation, the microwave signals having same phase can be input at a plurality of feeder interfaces, or are input at one feeder interface. Because different voltage microwave signals may be applied onto the microstrip line, difference occurs in deflection of different liquid crystals in the microstrip line, to generate a phase difference in the microwave signal passing through each via hole. When a plurality of microstrip lines are connected to one feeder interface, in order to prevent one microstrip line from interrupting other microstrip lines when the one microstrip line is feeded with a microwave signal or a voltage signal at the feeder interface, in some embodiments, a direct-current blocking circuit 20 is mounted at the feeder interface of the microstrip line, for blocking a direct-current signal interruption.

In specific embodiments, in the above phase-shift unit provided according to embodiments of the present disclosure, the phase-shift unit further comprises: a control unit 19 configured for transmitting the voltage signal that controls deflection of liquid crystal molecules in the liquid crystal layer. The microstrip line 13 is connected to the control unit through a lead wire, and the grounding layer is grounded. In particular, in order to control deflection of the liquid crystals, it requires to apply a voltage signal between the microstrip line and the grounding layer, accordingly, the control unit 19 is used for controlling a voltage difference between the microstrip line and the grounding layer when the liquid crystals of the liquid crystal layer are deflected. Moreover, in order to keep a good contact between the microstrip line and the control unit, the microstrip line 13 can be manufactured as a lead wire configured for connection to the control unit. The control unit may be a driver IC. Specifically, in order for further controlling the voltage difference between the microstrip line and the grounding layer, the grounding layer is grounded and is only used for controlling a voltage applied to the microstrip line.

Figure 6:
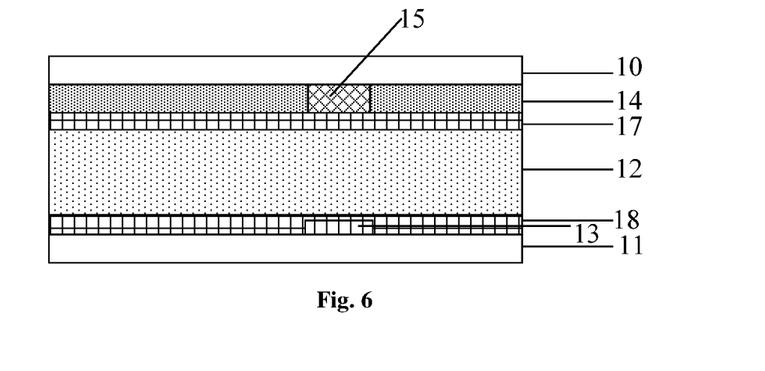
FIG. 6 is a sectional schematic view showing a still another phase-shift unit according to the embodiment of the present disclosure.

In specific embodiments, in the above phase-shift unit provided according to embodiments of the present disclosure, referring to FIG. 6, the phase-shift unit further comprises: a first alignment layer 17 and a second alignment layer 18 provided at either side of the liquid crystal layer 12, respectively.

Referring to FIG. 6, the first alignment layer 17 is provided between the liquid crystal layer 12 and the grounding layer 14; and the second alignment layer 18 is provided between the liquid crystal layer 12 and a film layer where the microstrip line 13 is located. In particular, the liquid crystal molecules of the liquid crystal layer have long axes and short axes, and the liquid crystal molecules are not deflected when no voltage difference exists between the microstrip line 13 and the grounding layer 14. In order to align orientations of the liquid crystal molecules so that long axes of the liquid crystal molecules are provided in parallel between the first substrate 10 and the second substrate 12, it needs to provide the first alignment layer 17 and the second alignment layer 18 to arrange an arrangement of orientations of the liquid crystal molecules.

It should be note that, both the microstrip line and the grounding layer according to embodiments of the present disclosure are metal layers having electrical conductivity. In formation of the grounding layer or the microstrip line on the first substrate or the second substrate, a manner of deposition, such as processes including sputtering, evaporation or electric plating, or other processes can be used.

The phase-shift unit provided according to embodiments of the present disclosure includes the liquid crystal layer, the first alignment layer and the second alignment layer provided at either side of the liquid crystal layer, respectively, the grounding layer provided at the side of the first alignment layer facing away from the second alignment layer, and the microstrip line provided at the side of the second alignment layer facing away from the first alignment layer. The liquid crystal layer is deflected under the action of the voltage difference between the microstrip line and the grounding layer, a corresponding deflection occurs in the phase of the microwave signal passing through the liquid crystal layer, thereby achieving the object of controlling the phase of the microwave signal by controlling the liquid crystal layer. The phase-shift unit provided according to embodiments of the present disclosure can achieve controlling of the phase of the microwave signal at any angles.

According to another embodiment of the present disclosure, there is provided an antenna array comprising at least two phase-shift units according to the abovementioned embodiment. In an embodiment, in order to achieve transmission and receipt of the antenna array at multiple angles by means of the phase-shift unit, each antenna array comprises at least two phase-shift units, to achieve transmission or receipt of the microwave signal at any angle.

Figure 7:
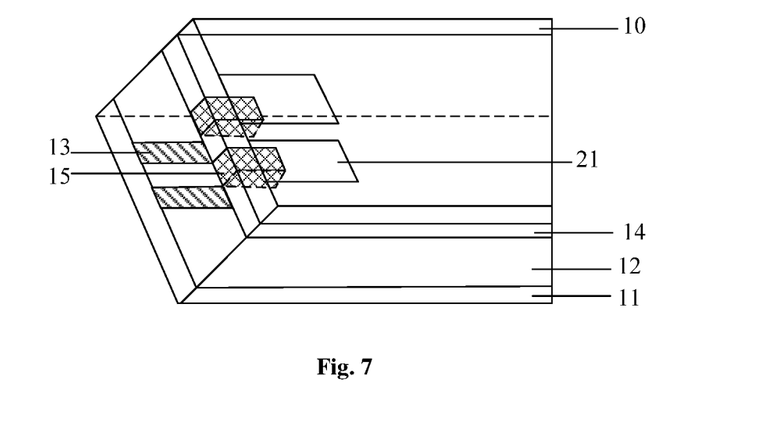
FIG. 7 is a structural schematic view showing an antenna array according to another embodiment of the present disclosure.
Figure 8:
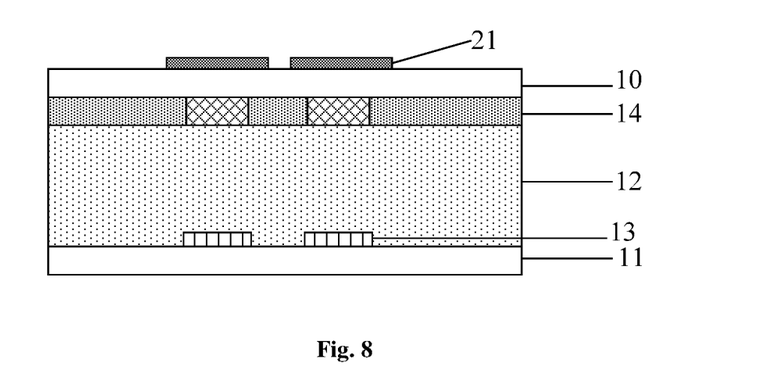
FIG. 8 is a sectional schematic view showing the antenna array of FIG. 7.

Based on the same inventive concept, according to embodiments of the present disclosure, there is also provided an antenna array comprising at least two phase-shift units according to the abovementioned embodiment, referring to FIG. 7 and FIG. 8. In an embodiment, the grounding layer 14 is provided at a side of the first substrate 10 facing towards the liquid crystal layer 12, and the antenna array further comprises: at least two patch units 21 provided at a side of the first substrate 10 facing away from the liquid crystal layer 12 and configured for transmitting or receiving the microwave signal, the patch units 21 are in a one-to-one positional correspondence to the via holes 15 in the grounding layer 14, and an orthographic projection of each via hole 15 onto the first substrate 10 is located within an orthographic projection of the patch unit 21 corresponding to the via hole 15 onto the first substrate.

Specifically, with the antenna array provided according to embodiments of the present disclosure, after the phase of the microwave signal is adjusted by the phase-shift unit, the microwave signal is coupled with the patch unit having radiation function through the via hole, and the microwave signal having a varied phase is transmitted at a fixed angle through the patch unit. Conversely, the patch unit feedbacks the microwave signal received at the fixed angle to the phase-shift unit through the via hole. Therefore, the antenna array provided according to embodiments of the present disclosure achieves transmission of the microwave signal at a fixed angle, reduces noise interruption, and improves utilization ratio of power of the microwave signal.

In one embodiment, the number of the patch units and the number of the via holes are identical, and positions of the patch units on the first substrate are in a one-to-one correspondence to positions of the via holes. In some embodiments, each antenna array comprises four via holes in an array arrangement, and comprises patch units being in a one-to-one correspondence to the four via holes. In order to enable the microwave signal passing through the via holes to be coupled to the patch unit in a better manner, an orthographic projection of the patch unit onto the first substrate at least covers an orthographic projection of the via hole onto the first substrate.

The antenna array provided according to embodiments of the present disclosure comprises the phase-shift unit provided according to embodiments of the present disclosure, accordingly, the antenna array provided according to embodiments of the present disclosure achieves phrase controlling by means of deflection of the liquid crystal layer, and thus changes the direction of the microwave signal radiated by the antenna array.

According to specified embodiments, in the antenna array provided according to embodiments of the present disclosure, the patch unit has a rectangular or circular shape. In particular, the patch unit may have any shape and is not specified limited herein.

Figure 9:
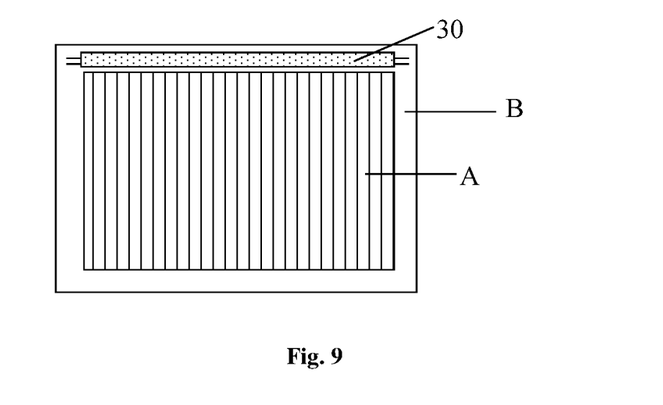
FIG. 9 is a top view showing a display panel according to a yet another embodiment of the present disclosure.

Based on the same inventive concept, according to a yet another embodiment of the present disclosure, there is also provided a display panel. Referring to FIG. 9, the display panel includes a display region A and a frame region B. In the frame region of the display panel, at least one set of the abovementioned antenna array 30 according to any of the embodiments of the present disclosure is included. For example, one set of the abovementioned antenna array 30 can include several antenna arrays 30 according to any of the embodiments of the present disclosure. In one embodiment, FIG. 9 shows only that the antenna array is provided at an upper frame of the display panel, however, the present disclosure is not limited to this.

Specifically, the antenna array is provided in the frame region of the display panel, and the antenna array comprises the liquid crystal layer. When the display panel also comprises a liquid crystal layer, in order to prevent the liquid crystal layer in the frame region from interrupting the liquid crystal layer in the display region, the liquid crystal layers in the display region and in the frame region are sealed respectively by adhesives. In addition, the antenna array is provided in the frame region of the display panel, including at any frame, where no printed circuit board (IC/FPC) is provided, of the frame region, and each display panel includes one antenna array or a plurality of antenna arrays, and it is not specifically limited herein.

In the frame region of the display panel provided according to embodiments of the present disclosure, the antenna array provided according to embodiments of the present disclosure is included. Since the antenna array provided according to embodiments of the present disclosure in structure includes the first substrate, the second substrate, and the liquid crystal layer provided between the first substrate and the second substrate, structure of the antenna array provided according to embodiments of the present disclosure can be manufactured together with the display panel, and thus the antenna array has good compatibility.

Figure 10:
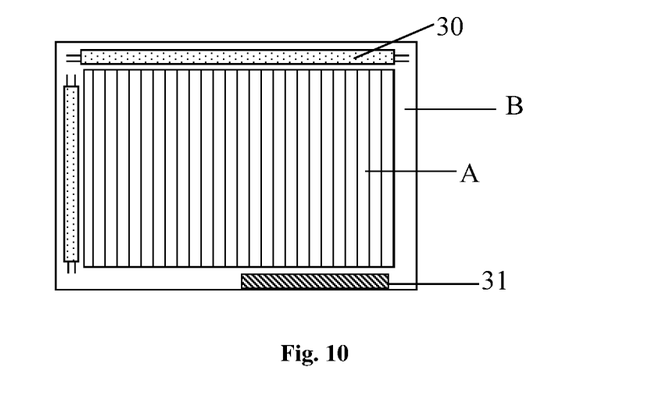
FIG. 10 is a top view showing another display panel according to the yet another embodiment of the present disclosure.
Figure 11:
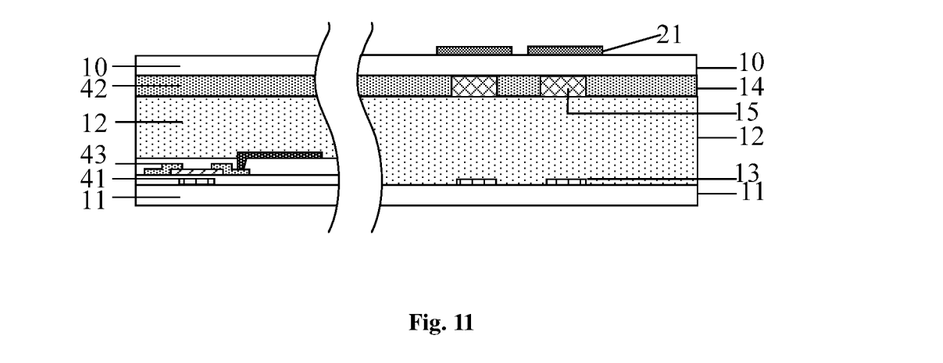
FIG. 11 is a partially sectional schematic view showing the display panel of FIG. 9.

In specific embodiments, in the abovementioned display panel provided according to embodiments of the present disclosure, the antenna array is provided at an upper frame, a left frame and/or a right frame of the display panel. In particular, referring to FIG. 10, the display panel further comprises a printed circuit board 31, and the printed circuit board 31 is provided at the lower frame of the display panel. When the display panel comprises a plurality of antenna arrays 30, the plurality of antenna arrays may be provided at the upper frame, the left frame and/or the right frame. FIG. 10 only shows an example in which the display panel comprises two antenna arrays 30. Structure of each antenna array is the same as that of the antenna array according to the another embodiment of the present disclosure. Moreover, there may be a plurality of patch units and microstrip lines in each antenna array, so that the object of receiving or transmitting the microwave signal at 360° can be achieved. For example, referring to FIG. 11, the microstrip line 13 of the antenna array 30 is provided in the same layer as a gate layer 41 of the display region, and the grounding layer 14 of the antenna array 30 is provided in the same layer as a common electrode layer 42 of the display region A. For another example, in an embodiment not shown, the microstrip line 13 of the antenna array 30 may be provided in the same layer as a source-drain layer 43 of the display region A, and the grounding layer 14 of the antenna array 30 is provided still in the same layer as the common electrode layer 42 of the display region A.

In specific embodiments, in the abovementioned display panel provided according to embodiments of the present disclosure, the first substrate is a color filter substrate and the second substrate is an array substrate; or, the first substrate is an array substrate and the second substrate is a color filter substrate. In particular, the microstrip line of the antenna array is provided in the frame region of the array substrate, and the grounding layer and the patch unit are provided at either side of the frame region of the color film substrate, respectively; or, the microstrip line of the antenna array is provided in the frame region of the color filter substrate, and the grounding layer and the patch unit are provided at either side of the frame region of the array substrate, respectively; or, when the display panel comprises at least two antenna arrays, in one antenna array, the microstrip line is provided in the frame region of the array substrate, and the grounding layer and the patch unit are provided at either side of the frame region of the color filter substrate, respectively; while, in the other antenna array, the microstrip line is provided in the frame region of the color film substrate, and the grounding layer and the patch unit are provided at either side of the frame region of the array substrate, respectively.

The display panel according to embodiments of the present disclosure is a liquid crystal display panel, the antenna array controls the phase of the microwave signal by means of deflection of liquid crystal molecules in the liquid crystal layer, and the antenna array can be manufactured together with the display panel and thus has a better compatibility.

Based on the same inventive concept, according to a still another embodiment of the present disclosure, there is also provided a display device comprising any one of the above-mentioned display panels provided according to the embodiments of the present disclosure. The display device may be any products or components having a display function, including a mobile phone, a tablet computer, a television, a display, a notebook computer, a digital photo frame, a navigator and the like. Implementations of the display device can refer to the abovementioned embodiments of the array substrate, and the description is not repeated for the sake of brevity.

Concerning the above, the phase-shift unit provided according to the one embodiment of the present disclosure comprises a first substrate and a second substrate assembled to each other; a liquid crystal layer between the first substrate and the second substrate; a microstrip line provided at a side of the second substrate facing towards the liquid crystal layer, and configured for receiving a voltage signal that controls deflection of liquid crystal molecules in the liquid crystal layer and for receiving or transmitting a microwave signal; and a grounding layer provided on the first substrate and including a via hole corresponding to the microstrip line. As a result, according to embodiments of the present disclosure, the liquid crystal layer is provided between the microstrip line and the grounding layer and will be deflected under a voltage difference between the microstrip line and the grounding layer. When the microwave signal propagates in the deflected liquid crystal layer, the phase of the microwave signal varies according to deflection of the liquid crystal layer, and the microwave signal is further transmitted through the via hole of the grounding layer. Therefore, the phase-shift unit according to embodiments of the present disclosure achieves use of liquid crystals as transmission media of the microwave signal and controlling of phase of the microwave signal according to the deflection of the liquid crystals. Moreover, the phase-shift unit provided according to embodiments of the present disclosure has good compatibility with a display panel.

The another embodiment of the present disclosure provides an antenna array. The antenna array provided according to the another embodiment of the present disclosure comprises the phase-shift unit of the one embodiment of the present disclosure, and the patch unit coupled to the via hole of the phase-shift unit. The microwave signal is radiated through the patch unit. Therefore, the antenna array provided according to the embodiments of the present disclosure can be provided in the display panel, and thus has a good compatibility with the display panel.

The yet another embodiment of the present disclosure provides a display panel, and the antenna array provided according to the another embodiment of the present disclosure is provided in the frame region of the display panel, thereby the antenna array can be manufactured at the same time when manufacturing the display panel and thus has a good compatibility.

The still another embodiment of the present disclosure provides a display device, and the antenna array provided according to the another embodiment of the present disclosure is provided in the frame region of the display panel thereof, thereby the antenna array can be manufactured at the same time when manufacturing the display panel thereof and thus has a good compatibility.

Obviously, those skilled in the art may make any changes and modifications to the present disclosure without departing from the principles and spirit of the disclosure. Thus, the present disclosure intends to include these changes and modifications to the present disclosure if they fall into the scope of the present disclosure defined in the claims and their equivalents.

The above specific embodiments are further description of objects, technique solutions and advantages of the present invention. It should be understood that, the above described contents are merely specific embodiments of the present invention, but not intended to limit the present disclosure. Any changes, equivalent alternatives, modifications, made within principles and spirit of the present disclosure, should be included within the scope of the present disclosure.

What is claimed is:

1. A phase-shift unit, comprising:
   a first substrate and a second substrate assembled to each other;
   a liquid crystal layer provided between the first substrate and the second substrate;
   a microstrip line provided at a side of the second substrate facing towards the liquid crystal layer, and configured for receiving a voltage signal that controls deflection of liquid crystal molecules in the liquid crystal layer and for receiving or transmitting an electromagnetic wave signal; and
   a grounding layer provided on the first substrate and including a via hole corresponding to the microstrip line;
   wherein a first end of the microstrip line corresponds in position to the via hole, and a second end of the microstrip line is connected to a feeder interface configured for feeding an electromagnetic wave signal from an electrical cable into the microstrip line, or for feeding the electromagnetic wave signal from the microstrip line into the electrical cable; and
   wherein the grounding layer is provided at a side of the first substrate facing towards the liquid crystal layer.

2. The phase-shift unit of claim 1, wherein, an orthographic projection of the via hole of the grounding layer onto the second substrate and an orthographic projection of the microstrip line onto the second substrate have an overlapped area therebetween.

3. The phase-shift unit of claim 1, wherein, the phase-shift unit further comprises a direct-current blocking circuit mounted at the feeder interface of the microstrip line and configured for avoiding interference of direct current signal.

4. The phase-shift unit of claim 1, wherein, the electromagnetic wave signal is a microwave signal.

5. The phase-shift unit of claim 1, further comprising: a control unit configured for transmitting the voltage signal that controls deflection of liquid crystal molecules in the liquid crystal layer;
   wherein, the microstrip line is connected to the control unit through a lead wire, and the grounding layer is grounded.

6. The phase-shift unit of claim 1, further comprising:
   a first alignment layer and a second alignment layer provided on opposite sides of the liquid crystal layer, respectively.

7. The phase-shift unit of claim 6, wherein, the first alignment layer is provided between the liquid crystal layer and the grounding layer; and
   the second alignment layer is provided between the liquid crystal layer and a film layer where the microstrip line is located.

8. An antenna array, comprising at least two phase-shift units of claim 1.

9. The antenna array of claim 8, wherein,
   the grounding layer is provided at the side of the first substrate facing towards the liquid crystal layer; and
   the antenna array further comprises:
      at least two patch units provided at the side of the first substrate facing away from liquid crystal layer and configured for transmitting or receiving the electromagnetic wave signal, wherein the patch units are in a one-to-one positional correspondence to the via holes of the grounding layer, and an orthographic projection of each via hole onto the first substrate is located within an orthographic projection of a respective patch unit corresponding to the via hole onto the first substrate.

10. The antenna array of claim 9, wherein, each of the patch units has a rectangular or circular shape.

11. The antenna array of claim 9, wherein, the antenna array comprises four via holes in an array arrangement, and the antenna array comprises patch units being in a one-to-one positional correspondence to the four via holes, and wherein an orthographic projection of each patch unit onto the first substrate at least covers an orthographic projection of a corresponding via hole onto the first substrate.

12. A display panel, comprising a display region and a frame region, wherein, at least one set of the antenna array of claim 8 is included in the frame region of the display panel.

13. The display panel of claim 12, wherein, the antenna array is provided at an upper region, a left region and/or a right region of a frame of the display panel.

14. The display panel of claim 12, wherein, the microstrip line of the antenna array is provided in the same layer as a gate layer or a source-drain layer of the display region, and the grounding layer of the antenna array is provided in the same layer as a common electrode layer of the display region.

15. The display panel of claim 12, wherein,
   the first substrate is a color filter substrate and the second substrate is an array substrate; or,
   the first substrate is an array substrate and the second substrate is a color filter substrate.

16. A display device, comprising the display panel of claim 12.

* * * * *